F. W. COLE.
AUXILIARIZED FIRE ALARM BOX.
APPLICATION FILED MAR. 9, 1909.

1,016,401.

Patented Feb. 6, 1912.
2 SHEETS—SHEET 1.

Witnesses:
H. B. Davis.
Cynthia Doyle

Inventor:
Frederick W. Cole
by Hayes & Harriman
Attys.

F. W. COLE.
AUXILIARIZED FIRE ALARM BOX.
APPLICATION FILED MAR. 9, 1909.

1,016,401.

Patented Feb. 6, 1912.

2 SHEETS—SHEET 2.

Witnesses:
H. B. Davis.
Cynthia Doyle.

Inventor:
Frederick W. Cole,
by Noyes & Harriman
attys.

UNITED STATES PATENT OFFICE.

FREDERICK W. COLE, OF NEWTON, MASSACHUSETTS, ASSIGNOR TO THE GAMEWELL FIRE-ALARM TELEGRAPH COMPANY, OF NEW YORK, N. Y., A CORPORATION OF NEW YORK.

AUXILIARIZED FIRE-ALARM BOX.

1,016,401.      Specification of Letters Patent.      Patented Feb. 6, 1912.

Application filed March 9, 1909. Serial No. 482,374.

*To all whom it may concern:*

Be it known that I, FREDERICK W. COLE, of Newton, county of Middlesex, State of Massachusetts, have invented an Improvement in Auxiliarized Fire-Alarm Boxes, of which the following is a specification.

This invention relates to auxilarized fire-alarm boxes, and is intended as an improvement upon the auxiliarized fire-alarm box shown in Letters-Patent #842,861, dated February 5, 1907.

The invention has for its object to provide the auxiliary actuating-mechanism with an improved form of let-off adapted to be operated by an independent actuator when released by an electro-magnet operated by the auxiliary-circuit; also, to provide the auxiliary actuating-mechanism with means for restoring said let-off; also, to provide improved mechanism for operating the locking-lever to release the signaling-train; also, to provide an improved form of operating-device for moving the actuating-lever to operate the locking-lever and thereby release the signaling-train; also, to provide actuating-mechanism for positively moving said operating-device in one direction to release the signaling-train and to provide independent means for returning it; also, to provide a switch for the auxiliary-circuit, and a switch-operating device therefor, and actuating-mechanism for releasing the signaling-train and for operating said switch-operating device, and two let-offs for said actuating-mechanism, one of which is controlled by an electro-magnet operated by the auxiliary-circuit and the other by the signaling-train in running.

Figure 1:
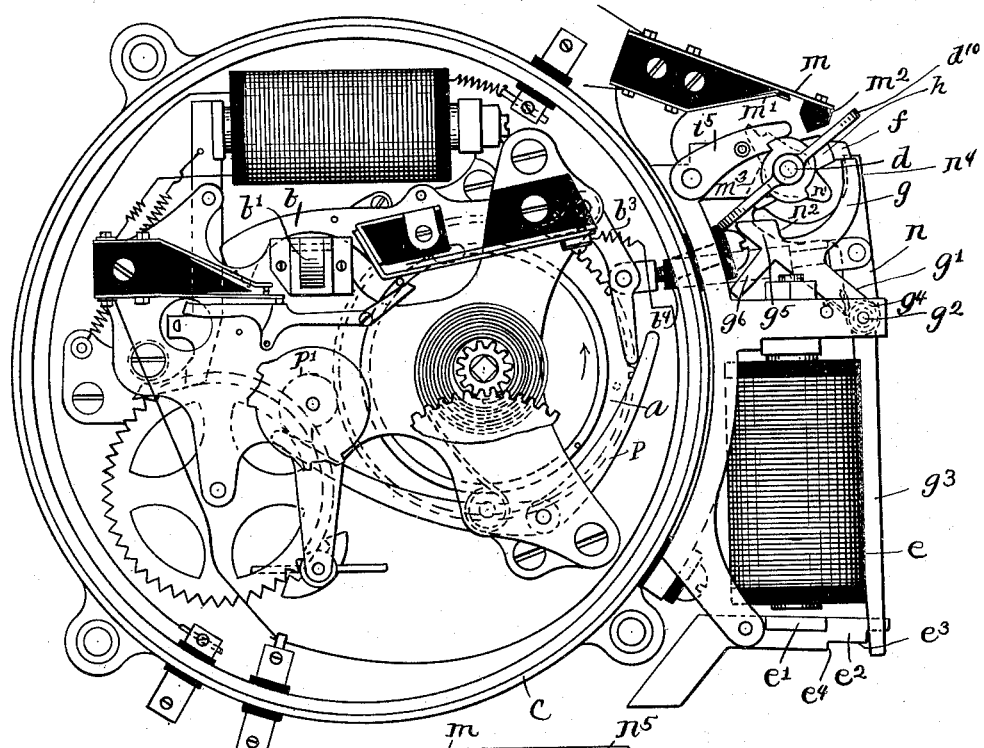
Figure 2:
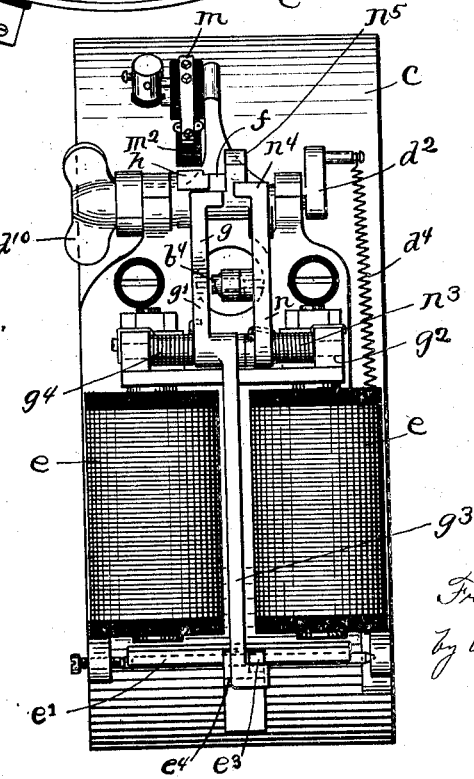
Figure 4:
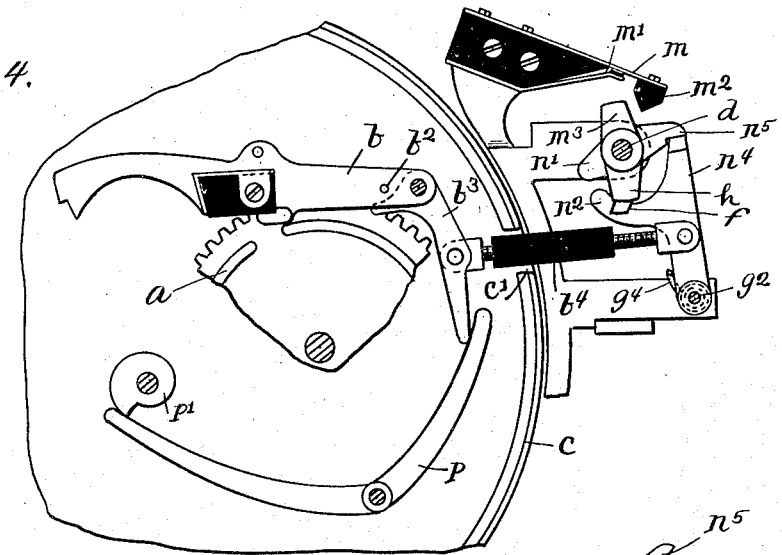
Figure 3:
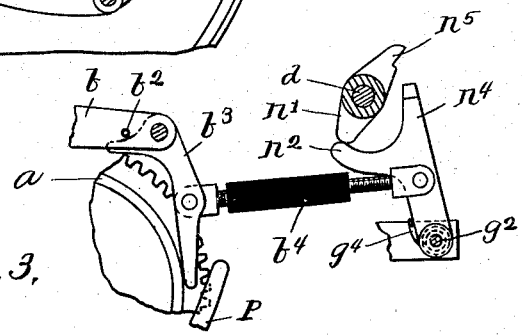
Figure 5:
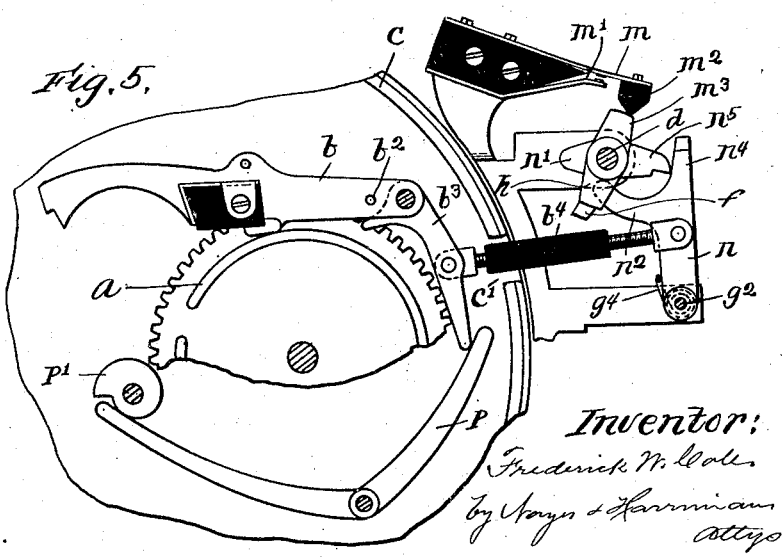

Figure 1 is a front elevation of an auxiliary fire-alarm box embodying this invention, the outer case being omitted, the parts being in their normal positions. Fig. 2 is a right hand side elevation of the same. Fig. 3 is a detail showing particularly the train-controlling and train-controlled parts and a portion of the auxiliary actuating-mechanism, the parts being in the positions they will occupy immediately after the train has been released. Fig. 4 is a similar view but more extended, showing the parts in the positions they will occupy after the signaling-train has been released and the auxiliary actuating-mechanism has been stopped but before the auxiliary-circuit switch has been operated. Fig. 5 is a similar view showing the parts in the positions they will occupy after the signaling-train has been released and the auxiliary-circuit switch has been opened.

$a$ designates the usual notched stop-wheel of an ordinary signaling-train; $b$ the locking-lever adapted to be held in engagement with said stop-wheel by a suitable spring, not shown; $b'$ the pull by means of which the locking-lever is raised to release the train; and $c$ the shell or case containing the train, having an opening $c'$ in its side wall. The signaling-train herein shown is normally wound, but my invention is not limited to the employment of a normally wound signaling-train.

The locking-lever $b$ has a laterally extended pin $b^2$ which is adapted to be engaged by a pivoted actuating-lever $b^3$, herein shown as loosely mounted on the shaft of the locking-lever for convenience, and to said actuating-lever one end of a link $b^4$ is connected, said link being extended through the opening $c'$ in the case and connected at its outer end to the auxiliary actuating-mechanism, so that by means of said mechanism the locking-lever may be lifted to disengage the stop-wheel and thereby release the train. The link $b^4$ herein comprises a pair of screw-threaded end-connections and an intermediate connecting bar of insulating material, and said link is moved longitudinally by the auxiliary actuating-mechanism to move the actuating-lever $b^3$ on its pivot. The auxiliary actuating-mechanism is supported upon the outside of the case, its frame being secured thereto.

$d$ designates the main shaft of the auxiliary actuating-mechanism, it having its bearings in the frame. It is adapted to be turned half a revolution or thereabout automatically to release the train and perform other functions ascribed to it, and to be turned the other half revolution manually for the purpose of winding it and for resetting it and the parts connected with it preparatory to being again operated automatically, and its successive operations are all in the same direction. It has at one end a crank-arm $d^2$ to which one end of a spring $d^4$ is connected, the other end of said spring being attached to a fixed part of the frame. Said spring $d^4$ serves as the actuating-spring for turning the shaft automatically half a revolution or thereabout.

Said shaft has secured to its opposite end a thumb-and-finger piece $d^{10}$, by which it may be turned to wind the shaft and place the spring $d^4$ under tension. Said shaft $d$ is prevented from backward movement by a pawl $i^5$ which engages teeth, like unto ratchet teeth, formed on a hub of the shaft.

The shaft $d$ has a projection or detent $f$ which is arranged to engage a let-off by which it is held with its actuating-spring under tension.

$g$ designates the let-off, which consists of a finger projecting from an arm $g'$ mounted loosely on a pivot-shaft $g^2$, supported by the frame, or said arm may be otherwise pivotally supported. The arm $g'$ is made quite short and has a long extension $g^3$ at the opposite side of the pivot, adapted at its extremity to engage the end of a lever $e^2$ carrying the armature $e'$ of the auxiliary electro-magnet $e$. A spring $g^4$ is connected with the arm $g'$, which, when permitted, acts to move said arm on its pivot-shaft to move the let-off from beneath the detent $f$ to thereby release the shaft $d$. The end of the armature-lever $e^2$ is formed with a shoulder $e^3$ against which the end of the extension $g^3$ bears when the auxiliary actuating-mechanism is set in condition to operate, and when the armature $e'$ is attracted the lever $e^2$ is moved to disengage said shoulder from the extension $g^3$, thereby permitting the spring $g^4$ to move the let-off. By making the let-off independent of the armature-lever, and providing it with an independent mechanical actuator, such for instance as the spring $g^4$, and providing it with a long extension, such for instance as $g^3$, but little energy is required to attract the armature and release the let-off to enable said let-off to operate and release the auxiliary actuating-mechanism. This is of advantage in case the battery or other source of energy for the auxiliary-circuit should become weakened for any cause. The armature-lever $e^2$ has another shoulder $e^4$, near the shoulder $e^3$, which is engaged by the extremity of the extension $g^3$ when said extension is disengaged from the shoulder $e^3$, and is moved by the spring $g^4$, said shoulder $e^4$ limiting the movement of the extension and thereby determining the abnormal position of the let-off. The arm $g'$ also bears a finger $g^5$ when said arm is moved to move the let-off from beneath the detent $f$, said finger is moved into position to be engaged by a cam $h$ on the shaft $d$ during the first half revolution for the purpose of resetting the let-off. Engagement of the cam with said finger moves the let-off in opposition to its actuating-spring, $g^4$ to cause its extension $g^3$ to again engage the shoulder $e^3$. Said finger $g^5$ has an extension $g^6$, which, by striking a stop or fixed part of the frame limits the return movement of the let-off.

The link $b^4$ which is connected with the actuating-lever $b^3$, is made adjustable longitudinally, and its outer end is loosely connected with an operating-device. Said operating-device as herein shown, consists of an arm $n$ mounted loosely on the pivot-shaft $g^2$, having an engaging-portion adapted to be engaged by means operated by the shaft $d$, whereby it is moved positively in one direction, to thrust forward the link and move the actuating-lever $b^3$ to lift the locking-lever, and a spring is provided for moving said operating-device in the opposite direction. As herein shown, the shaft $d$ bears a cam $n'$ which is arranged to engage a finger $n^2$ on the arm $n$, during the first part of the first half-revolution of the shaft $d$, to positively move said arm, and thereafter to disengage said finger during the last part of said first half-revolution to permit said arm to be moved in the opposite way by its controlling spring.

$n^3$ represents the controlling spring which is connected with the arm $n$. The signaling-train is thus released during the first part of the first half-revolution of the shaft $d$.

The auxiliary electro-magnet $e$ is included in the auxiliary-circuit which is provided with any number of circuit-operating-devices, and the armature of said electro-magnet is normally held retracted. Said auxiliary-circuit has a switch for opening it, when the auxiliary actuating-mechanism has been operated, to send a return signal and to disable the auxiliary-circuit until the auxiliary actuating-mechanism has been reset, and said switch is herein designed to be operated as in the patent aforesaid by the joint or combined action of the auxiliary actuating-mechanism and the signaling-train in running. $m, m'$ represents the two contact members of said switch, which are normally in engagement with each other, thereby maintaining the circuit closed at this point, and the uppermost member $m$ has a projection $m^2$ which is arranged to be engaged by a cam $m^3$ on the shaft $d$ for the purpose of lifting said member free from the lowermost member to thereby open the circuit. For the purpose of enabling the switch to be operated by the joint action of the auxiliary actuating-mechanism and the signaling-train in running, the cam $m^3$ is arranged on the shaft $d$, so as to engage the projection $m^2$ after said shaft has operated to release the signaling train, as for instance, during the last part of the first half-revolution of said shaft, and means are provided for stopping rotation of said shaft after it has been released by the electro-magnet and has operated to release the signaling-train and before said cam $m^3$ engages the projection $m^2$, which is adapted to be subsequently operated by means controlled by the signaling-train in running to again release said shaft and permit it to continue its movement and cause the cam $m^3$ to engage the projection $m^2$. In other words, the auxiliary actuating-mechanism is first released by the electro-magnet operated by the auxiliary-circuit to effect the release of the signaling-train, and is then again released by the signaling-train to effect the operation of the auxiliary-circuit switch. To thus check the operation of the auxiliary-actuating-mechanism at the proper time after it has been released by the electro-magnet another let-off is employed, which, as herein shown, is arranged on the arm $n$ of the operating-device with which is adapted to coöperate a detent $n^5$ on the shaft $d$. The let-off $n^4$ has a lateral projection for the engagement therewith of the detent $n^5$, see Fig. 2, said detent moving in the plane of the projection and not of the arm bearing it. The operating-device is normally held with the let-off $n^4$ occupying a position in the path of movement of the detent $n^5$ so as to be engaged thereby. Yet, during such time it is adapted to be operated by the cam $n'$ for the purpose of operating the actuating-lever $b^3$. As a means for thus holding the operating-device a lever $p$ is employed which is pivoted to the frame, one end of which extends over the end of the actuating-lever $b^3$ and the other end engages a cam-disk $p'$ which is secured to one of the shafts of the signaling-train, as for instance, it may be secured to the shaft bearing the signal-wheel. As the actuating-lever is connected with the operating-device by the link $b^4$ engagement of the lever $p$ therewith acts to hold the operating-device.

It will be noted that the actuating-lever is free to be moved by the operating-device in one direction, for the purpose of lifting the locking-lever, as shown in Fig. 3, and is so moved during the first part of the first half-revolution of the shaft $d$. The lever $p$, however, acts particularly to prevent movement of the actuating-lever and the operating-device connected therewith in the opposite direction, and hence the let-off $n^4$ is held in the path of movement of the detent, as shown in Fig. 4, to be engaged thereby, as soon as the shaft $d$ has turned sufficiently. At this time the cam $n'$ has disengaged the finger $n^2$, having performed its function. The parts remain in this position while the signaling-train continues to run until the high part of the cam $p'$ disengages the lever $p$, whereupon said lever is free to move to permit the actuating-lever and operating-device connected therewith to be moved by the controlling-spring $n^3$, and the let-off $n^4$ to be removed from beneath the detent $n^5$ to thereby again release the shaft $d$ and permit it to complete its half-revolution and the cam $m^3$ to be brought into engagement with the projection $m^2$ to open the auxiliary-circuit-switch, as shown in Fig. 5. The parts remain in this position until the auxiliary-actuating-mechanism is rewound, with the exception that the lever $p$ is operated by the cam-disk to restore the actuating-lever and the operating-device and let-off borne by it, so that when the signaling-train ceases to operate said parts will have resumed their normal positions. As the cam-disk is here shown on the signal-wheel shaft, particularly for convenience, and the signal-wheel on said shaft is designed to send one round of a signal during each revolution, it will be noted that said parts incidently are restored at the end of each revolution of said shaft, or end of each round of the signal.

Having thus described my invention, what I claim as new and desire to secure by Letters Patent is:—

1. In an auxiliary fire-alarm box the combination of a signaling-train, auxiliary actuating-mechanism therefor having a detent, an electro-magnet adapted to be operated by the auxiliary-circuit, its armature and armature-lever, a spring-actuated let-off arranged to be engaged by said detent and adapted to engage said armature-lever, and means operated by the auxiliary actuating-mechanism for restoring said let-off, substantially as described.

2. In an auxiliary fire-alarm box, the combination of a signaling-train, auxiliary actuating-mechanism therefor having a detent, an electro-magnet adapted to be operated by the auxiliary-circuit, its armature and armature-lever, and a spring-actuated let-off arranged to be engaged by said detent and adapted to engage said armature-lever and having a finger, and a cam operated by the auxiliary actuating-mechanism which engages said finger and restores the let-off, substantially as described.

3. In an auxiliary fire-alarm box, the combination of a signaling-train, an auxiliary actuating-mechanism comprising a shaft bearing a detent, a spring for turning said shaft a partial revolution, a pivotally supported member having a finger adapted to be engaged by said detent and having a long extension, a spring for moving said member, an electro-magnet, an armature, and armature-lever arranged to be engaged by said extension, and means operated by said shaft during said partial revolution for releasing said train, substantially as described.

4. In an auxiliary fire-alarm box, the combination of a signaling-train, an auxiliary actuating-mechanism comprising a shaft bearing a detent and a cam, a spring for turning said shaft a partial revolution, a winding-device for turning said shaft in the same direction to complete said revolution, a pivotally supported spring-actuated member having two fingers, one adapted to be engaged by said detent to hold the shaft and the other adapted to be engaged by said cam to restore said member, an electro-magnet, an armature and armature-lever, an extension on said member adapted to engage said armature-lever, and means operated by said shaft during the first part of its revolution to release the train, substantially as described.

5. In an auxiliary fire-alarm box, the combination of a signaling-train having a locking-lever, an actuating-lever for said locking-lever, a pivotally supported member having a finger, a link connecting said actuating-lever with said member, spring-operated mechanism including a cam for engaging said finger to move said member, and an electro-magnet controlling the operation of said spring-operated mechanism, substantially as described.

6. In an auxiliary fire-alarm box, the combination of a signaling-train having a locking-lever, an actuating-lever for said locking-lever, a pivotally supported spring-controlled member having a finger, a link connecting said actuating-lever with said member, a shaft, a cam borne by it for engaging said finger to move said member against the action of its controlling spring, a spring for turning said shaft a part of a revolution and an electro-magnet controlling the operation of said shaft, substantially as described.

7. In an auxiliary fire-alarm box, the combination of a signaling-train having a locking-lever, an actuating-lever for said locking-lever, a pivotally supported spring-controlled member having a finger, a link connecting said actuating-lever with said member, a shaft, a cam borne by it for engaging said finger to move said member against the action of its controlling-spring, a spring for turning said shaft a part of a revolution, an electro-magnet controlling the operation of said shaft, and a winding-device on said shaft by which it may be turned in the same direction another part of a revolution to reset it, substantially as described.

8. In an auxiliary fire-alarm box, the combination of a signaling-train having a locking-lever, an actuating-lever for said locking lever, a spring controlled operating-device, means connecting said actuating-lever with said operating-device, actuating-mechanism for moving said operating-device against the action of its controlling-spring to operate the actuating-lever, and an electro-magnet controlling the operation of said actuating-mechanism, substantially as described.

9. In an auxiliary fire-alarm box, the combination of a signaling-train having a locking-lever, an actuating-lever for said locking-lever, a pivoted spring-controlled operating-lever, means connecting said actuating-device with said operating-device, actuating-mechanism for moving said operating-device against the action of its controlling spring and for thereafter releasing it, permitting its controlling-spring to return it, and an electro-magnet controlling the operation of said actuating-mechanism, substantially as described.

10. In an auxiliary fire-alarm box, the combination of a signaling-train having a locking-lever, a pivoted actuating-lever arranged adjacent said locking-lever for operating it to release the train, actuating-mechanism for moving said actuating-lever in one direction to operate the locking-lever, a spring for moving it in the opposite direction, and an electro-magnet controlling the operation of said actuating-mechanism, substantially as described.

11. In an auxiliary fire-alarm box, the combination of a signaling-train, auxiliary actuating-mechanism for releasing it, a switch adapted to open the auxiliary-circuit, a switch-operating device operated by said mechanism, means for releasing said mechanism permitting it to operate and release the train, means for stopping said mechanism after it has released the train and before it has operated the switch-operating device, and means, operated by the train in running, for thereafter releasing said actuating-mechanism, permitting it to complete its operation and operate the switch-operating device, substantially as described.

12. In an auxiliary fire-alarm box, the combination of a signaling-train, auxiliary actuating-mechanism for releasing it, a switch adapted to open the auxiliary circuit comprising a pair of contact pens normally engaging each other, a cam operated by the actuating-mechanism for lifting one of said contact pens to open the circuit, means for releasing said actuating-mechanism permitting it to operate and release the signaling-train, means for stopping said actuating-mechanism after the train is released and before the cam engages the contact pen, and means, operated by the signaling-train in running, for thereafter releasing said actuating-mechanism, permitting it to complete its operation and move the cam into engagement with the contact-pen, substantially as described.

13. In an auxiliary fire-alarm box, the combination of a signaling-train, actuating-mechanism for releasing it, a switch adapted to open the auxiliary circuit, a switch-operating device operated by said actuating-mechanism, means for releasing said actuating-mechanism permitting it to operate and release the train, a detent and let-off for stopping said actuating-mechanism after the train is released and before the switch-operating device has operated the switch, means operated by the train in running for moving said let-off to release the actuating-mechanism, permitting it to complete its operation and cause the switch-operating device to operate the switch, substantially as described.

14. In an auxiliary fire-alarm box, the combination of a signaling-train, auxiliary actuating-mechanism for releasing it, a switch adapted to open the auxiliary circuit, a switch-operating device operated by said mechanism, two let-offs adapted to be operated successively to release said mechanism, an electro-magnet for releasing one of said let-offs, and means, operated by the signaling-train in running, for releasing the other let-off, substantially as described.

15. In an auxiliary fire-alarm box, the combination of a signaling-train having a locking-lever, an actuating lever for said locking-lever, an operating-device, a link connecting said actuating-lever with said operating-device, actuating-mechanism for moving said operating-device to operate the actuating-lever, a switch for the auxiliary-circuit adapted to be operated by said actuating-mechanism, a main let-off for the train, an electro-magnet for releasing it to release the train, a supplementary let-off for the train connected with said operating-device, adapted to release the train upon the return movement of said operating-device, and means, operated by the train in running for stopping the operating-device on its return movement and for thereafter releasing it, permitting it to complete its operation and release the actuating-mechanism, substantially as described.

16. In an auxiliary fire-alarm box, the combination of a signaling-train having a locking-lever, an actuating-lever for said locking-lever, an operating-device connected with said actuating-lever, actuating-mechanism for said operating-device, a let-off therefor controlled by an electro-magnet, and another let-off therefor borne by said operating-device, movement of which to release the actuating-mechanism is controlled by the signaling-train, substantially as described.

In testimony whereof, I have signed my name to this specification, in the presence of two subscribing witnesses.

FREDERICK W. COLE.

Witnesses:
H. B. DAVIS,
B. J. NOYES.